United States Patent
Iwai et al.

(10) Patent No.: US 6,687,448 B2
(45) Date of Patent: *Feb. 3, 2004

(54) METHOD OF PROCESSING A SUBSTRATE MADE OF A FERROELECTRIC SINGLE CRYSTALLINE MATERIAL

(75) Inventors: Makoto Iwai, Kasugai (JP); Tatsuo Kawaguchi, Motosu-Gun (JP); Minoru Imaeda, Nagoya (JP)

(73) Assignee: NGK Insulators, Ltd., Nagoya City (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,190

(22) Filed: Feb. 16, 1999

(65) Prior Publication Data

US 2001/0031123 A1 Oct. 18, 2001

(30) Foreign Application Priority Data

Feb. 17, 1998 (JP) ............................................ 10-034823

(51) Int. Cl.$^7$ ................................................. G02B 6/10
(52) U.S. Cl. ...................................... 385/132; 385/129
(58) Field of Search ................................ 385/122–132; 117/952, 945; 264/1.21, 1.24, 1.7, 2.7; 112/945, 952

(56) References Cited

U.S. PATENT DOCUMENTS

| | | | |
|---|---|---|---|
| 4,887,878 A | | 12/1989 | Robinson et al. ............... 385/2 |
| 5,249,191 A | * | 9/1993 | Sawaki et al. .................. 372/22 |
| 5,323,262 A | * | 6/1994 | Mizuuchi et al. ............. 359/322 |
| 5,432,881 A | * | 7/1995 | Doi ............................. 385/132 |
| 5,438,637 A | * | 8/1995 | Nilsson et al. ................ 385/10 |
| 5,943,465 A | * | 8/1999 | Kawaguchi et al. .......... 385/122 |

FOREIGN PATENT DOCUMENTS

| | | | | |
|---|---|---|---|---|
| EP | 782 017 | * | 7/1997 | .................. 385/132 |
| EP | 0 802 447 A2 | | 10/1997 | |
| EP | 0 816 880 A2 | | 7/1998 | |
| EP | 0 922 793 A2 | | 6/1999 | |
| JP | 63-17718 | * | 11/1994 | .................. 385/132 |
| JP | 10-3100 | | 1/1998 | |

OTHER PUBLICATIONS

English Abstract of JP reference No. 1–314,207, published Dec. 1989.
English Abstract of JP reference No. 7–159,637, published Jun. 1995.
Cheng, Rei–Shin et al., *Wet–Etched Ridge Waveguides in Y–Cut Lithium Niobate*, Journal of Lightwave Technology, vol. 15, No. 10, Oct. 1997, pp. 1880–1887.
Lee, Hyung–Jae et al., *Proton Exchanged LiNbO$_3$ Ridge Waveguide Fabricated by Wet Etching Process*, Technical Digest 1995, Integrated Photonics Research, IthG25–1, pp. 171–173.

(List continued on next page.)

Primary Examiner—Thong Nguyen
(74) Attorney, Agent, or Firm—Burr & Brown

(57) ABSTRACT

A method of processing a substrate made of a ferroelectric single crystalline material, including the steps of forming a desired proton-exchanged layer in the substrate by proton-exchanging a portion of the substrate, and selectively removing the proton-exchanged layer to form a concave ditch structure in the ferroelectric single crystalline substrate, wherein the desired proton-exchange layer is formed by using an acid containing a lithium salt as a proton-exchanging source, the surface of the substrate from which the concave ditch structure is formed is an X-cut surface or a Z-cut surface, as a main surface, of the ferroelectric single crystalline material used as the substrate, and the concave ditch structure has a recessed portion with its depth equal to or larger than its half opening width.

19 Claims, 3 Drawing Sheets

OTHER PUBLICATIONS

Li, M.J. et al., *High Index Low Loss LiNbO$_3$ Waveguides*, Optics Communications, vol. 62, No. 1, Apr. 1, 1987, pp. 17–20.

Hinkov, V. et al., *Control of Birefrigerence in Ti: LiNbO$_3$ Optical Waveguides by Proton Exchange of Lithium Ions*, Journal of Lightwave Technology, vol. Lt–4, No. 4, Apr. 1986, pp. 444–448.

Zhang, Hui et al., *Fully Planar Proton–Exchanged Lithium Niobate Waveguides with Grating Taps*, Applied Optics, vol. 33, No. 16, Jun. 1, 1994, pp. 3391–3393.

Laurell, Fredik et al., *Wet Etching of Proton–Exchanged Lithium Niobate—A Novel Processing Technique*, Journal of Lightwave Technology, vol. 10, No. 11, Nov. 1992, pp. 1606–1609.

Suchoski, P.G. et al., *Stable Low–Loss Proton–Exchanged LiNbO$_3$ Waveguide Devices with No Electro–Optic Degradation*, Optics Letters, vol. 13, No. 11, Nov. 1988, pages 1050–1052.

* cited by examiner

PRIOR ART
FIG. 1
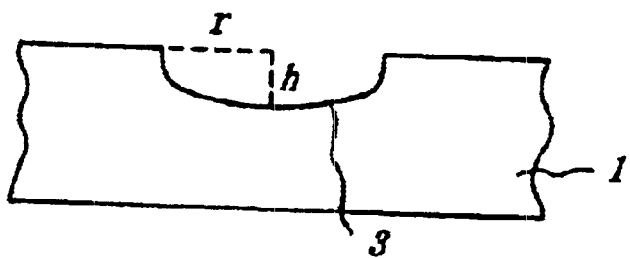
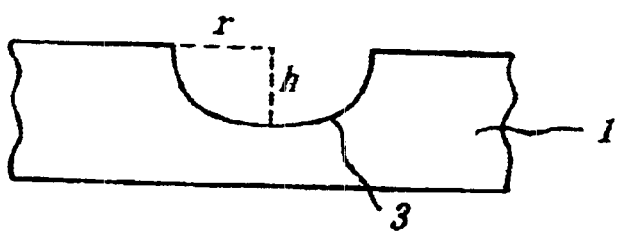
FIG. 2a
FIG. 2b
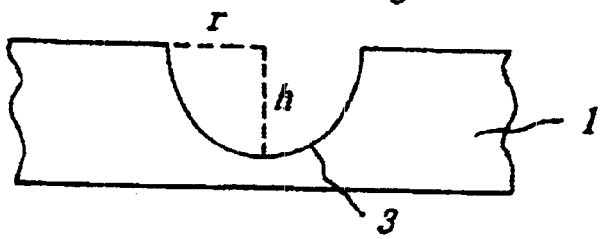
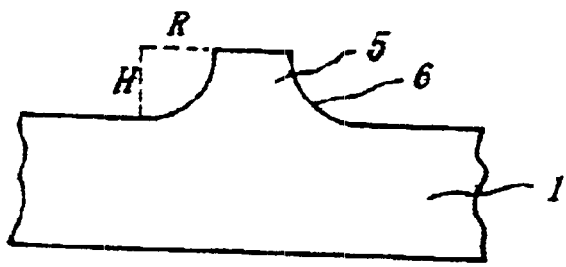
FIG. 3a
FIG. 3b
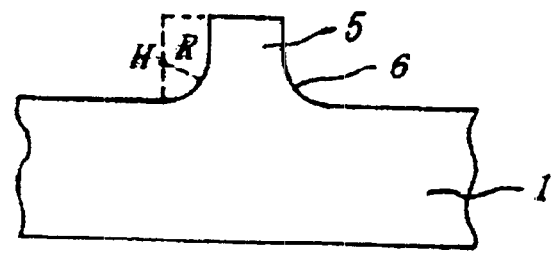

METHOD OF PROCESSING A SUBSTRATE MADE OF A FERROELECTRIC SINGLE CRYSTALLINE MATERIAL

BACKGROUND OF THE INVENTION

(1) Field of the Invention

This invention relates to a method of processing a substrate made of a ferroelectric single crystalline material, and more particularly to a method of processing a substrate of a ferroelectric single crystalline material suitable for a Second-Harmonic-Generation device using the Quasi-Phase-Matched type, an optical modulator, an optical switch and the like. This invention also relates to the substrate as well as an optical waveguide element using such a substrate.

(2) Related Art Statement

The Second-Harmonic-Generation (SHG) device using the Quasi-Phase-Matched (QPM) type, in which a periodical polarizing inversion structure is formed on a $LiNbO_3$ or $LiTaO_3$ single crystal, is expected as a light source for a blue laser usable as an optical pickup or the like. This device can be widely used as an optical pickup or the like for optical disk memory, medicine, photochemistry, and various optical measurements.

An optical modulated device such as an optical modulator using an optical waveguide formed on a $LiNbO_3$ single crystal or an optical switch, is expected in the field of the optical communication or the information processing.

The optical waveguide device used as the SHG device, the optical modulator or the like is generally manufactured as follows.

A substrate of a ferroelectric crystalline material such as $LiNbO_3$ is proton-exchanged by dipping it in a solution of benzoic acid or a solution of pyrophosphoric acid to form a desired proton-exchanged pattern, and diffusing the protons into the substrate by annealing it at 300 to 400° C. for 0.1 to 5 hours, whereby an optical waveguide is formed.

In another method, an optical waveguide is formed by vapor depositing a metal such as Ti onto a substrate of a ferroelectric single crystalline material such as $LiNbO_3$ to form a pattern, and thermally diffusing the Ti metal or the like into the substrate under heating at 900 to 1100° C. for 4 to 40 hours.

However, in these methods, it has been difficult to form an optical waveguide having a stepped refractive index distribution with a large optically confining effect, so that it has been difficult to attain sufficiently large optical fiber coupling efficiency (the amount ratio of output light to input light in an optical waveguide device). Moreover, light damaging resistance or optoelectrical constant unfavorably was deteriorated.

Considering the above problems, NGK Insulators, Ltd. invented a method of manufacturing a new optical waveguide device suitable for use in a SHG device or the like, and filed Japanese patent application No. 9-52,679 directed to this new optical waveguide device-manufacturing method.

That is, a substrate of ferroelectric single crystalline material such as $LiNbO_3$ is proton-exchanged by dipping it in a solution of benzoic acid or a solution of pyrophosphoric acid, a proton-exchanged portion is selectively removed by wet-etching the thus obtained proton-exchanged layer with a solution of hydrofluoric acid or a solution of nitric acid to thereby form a recessed portion having a substantially semicircular sectional shape, and thereafter a ferroelectric optical waveguide is formed, through a film formation, by a liquid phase epitaxial method, on the substrate in which the recessed portion is formed.

However, the above method being used, when the temperature of proton-exchanging is higher than 180° C., a half opening width "r" in the recessed portion formed in the ferroelectric substrate is larger than the depth "h" therein as shown in FIG. 1, whereby the recessed portion often has a shape having semi-elliptical cross section which is shallow in the vertical direction to the substrate.

In this specification, as apparent from FIG. 1, the wording "half opening width" is defined as a half value of opening width in the recessed portion.

SUMMARY OF THE INVENTION

It is an object of this invention to provide a method of processing a substrate of ferroelectric single crystalline material such that a concave ditch structure having a recessed portion with a depth equal to or larger than an half opening width, or a convex ridge structure having shoulder portions with a height equal to or larger than a radius curvature of each of curved portions and that the concave ditch structure and the convex ridge structure can be used for forming onto the substrate an optical waveguide exhibiting a stepped refractive index distribution which has large optically confining effect.

This invention relates to a method of processing a substrate made of a ferroelectric single crystalline material, comprising the steps of forming a desired proton-exchanged layer in the substrate by proton-exchanging a portion of the substrate, and selectively removing the proton-exchanged layer to form a concave ditch structure in the ferroelectric single crystalline substrate, wherein the desired proton-exchange layer is formed by using an acid containing a lithium salt as a proton-exchanging source, the surface of the substrate from which the concave ditch structure is formed is an X-cut surface or a Z-cut surface, as a main surface, of the ferroelectric single crystalline material used as the substrate, and the concave ditch structure has a recessed portion with its depth equal to or larger than its half opening width.

This invention also relates to a method of processing a substrate made of a ferroelectric single crystalline material, comprising the steps of forming a desired proton-exchanged layer in the substrate by proton- exchanging portions of the substrate, and selectively removing the proton-exchanged layer to form a convex ridge structure, wherein the desired proton-exchange layer is formed by using an acid containing a lithium salt as a proton-exchanging source, the surface of the substrate from which the convex ridge structure is formed is an X-cut surface or a Z-cut surface, as a main surface, of the ferroelectric single crystalline material used as the substrate, and the convex ridge structure has shoulder portions with their height equal to or larger than a radius of curvature of each of curved portions.

According to the method of processing a substrate of the ferroelectric single crystalline material of this invention, as shown in FIGS. 2(a) and 2(b), a concave ditch structure having a recessed portion, in which its half opening width "r" is equal to (FIG. 2(a)) or less than (FIG. 2(b)) its depth "h", can be formed on the substrate of ferroelectric single crystalline material, or a convex ridge structure having shoulder portions, in which its radius of curvature "R" of each of curved portions 6 is equal to (FIG. 3(a)) or less than (FIG. 3(b)) its height "H", can be formed on the substrate of ferroelectric single crystalline material.

Although these reasons are not apparent, it is considered as follows.

Generally in a ferroelectric crystal such as $LiNbO_3$, a diffusion coefficient of protons therein changes depending on a dissociation constant of an acid used for proton-exchanging and its crystal orientation.

Generally as the dissociation constant of the acid is large, the proton diffusion coefficient is large, and as the dissociation constant thereof is small, the diffusion coefficient thereof is small.

Moreover in the ferroelectric crystalline material, the proton diffusion coefficient in the Z direction of the crystal is smaller than in the X or Y direction.

According to this invention, when an acid containing a lithium salt as a proton source is used, the dissociation constant of the acid can be made smaller to thereby be capable of controlling the dissociation constant. Moreover, when an X-cut surface or a Y-cut surface of a ferroelectric crystal is used as a main surface of a substrate of ferroelectric single crystalline material, the dependency between the dissociation constant of the acid and the crystal orientation in the diffusion coefficient of protons can be adjusted in a balanced manner, whereby the proton diffusion coefficient in the vertical direction to the main surface of the substrate can be equalized to or made larger than that in the parallel direction to the main surface of the substrate.

Therefore, a proton-exchanged layer in which protons diffuse equally in the vertical direction and the parallel direction to the substrate can be obtained. Alternatively, a proton-exchanged layer in which protons diffuse in the vertical direction more greatly than in the parallel direction to the substrate can be obtained. By selectively removing the proton-exchanged layer, as shown in FIGS. 2(a) and 2(b), the concave ditch structure having a recessed portion with its half opening width "r" being equal to or less than its depth "h" is formed, or as shown in FIGS. 3(a) and 3(b), the convex ridge structure having shoulder portions with its height "H" being equal to or larger than the radius of curvature "R" of each of the curved portions 6, can be formed.

On the other hand, "Wet-Etched Ridge Waveguides in Y-Cut Lithium Niobate" (J. LIGHTWAVE TECHNOLOGY, VOL. 15, NO. 10, OCTOBER, 1997, P1880~1887) shows that an acid containing a lithium salt is used to proton-exchange a Y-cut surface of a lithium niobate single crystal as a main surface of a substrate of ferroelectric single crystalline material.

This invention, however, requires that an X-cut surface or a Z-cut surface of ferroelectric crystal is used as the main surface of the substrate of ferroelectric single crystalline material. On the contrary, when a Y-cut surface of a ferroelectric crystal is used as the main surface of the substrate, as shown in FIG. 15 of this literature, only a convex ridge structure having a semi-elliptical sectional shape which is shallow in the vertical direction to the substrate surface is formed. Accordingly the object of this invention can not be attained.

BRIEF DESCRIPTION OF THE DRAWINGS

For a better understanding of this invention, reference is made to the attached drawings, wherein:

FIG. 1 is a cross sectional view showing a recessed portion of a substrate which is formed by a conventional method of processing the substrate of ferroelectric single crystalline material;

FIGS. 2(a) and 2(b) are cross sectional views respectively showing a recessed portion of a substrate which is formed by a method of processing a substrate of ferroelectric single crystalline material according to the present invention;

FIGS. 3(a) and 3(b) are cross sectional views respectively showing a ridge portion of a substrate which is formed by a method of processing a substrate of ferroelectric single crystalline material according to the present invention;

DETAILED DESCRIPTION OF THE PREFERRED EMBODIMENTS

This invention will be described below in more detail with reference to the FIGS. 4(a) through 4(d) A substrate of ferroelectric single crystalline material 1 to be used in the present invention is required to have an X-cut surface or a Z-cut surface of the ferroelectric single crystalline material as its main surface so that by balancing an effect of its crystal orientation with an effect of dissociation constant of protons, as shown in FIG. 2, a recessed portion with its depth "h" being equal to or larger than its half opening width "r" can be formed.

Figure 4A:
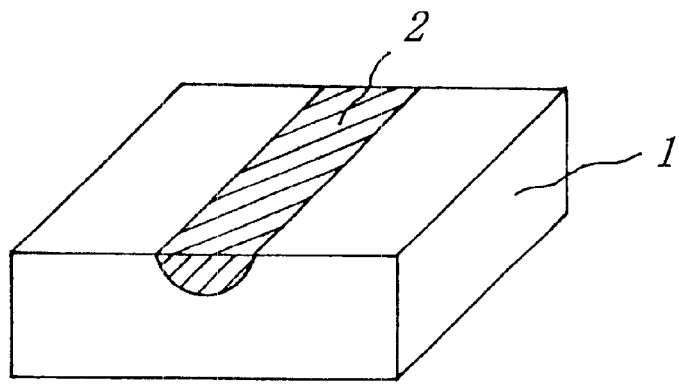
FIGS. 4(a) through 4(d) are cross sectional views showing the steps of manufacturing an embedded-type optical waveguide device.

Not particularly limited, the substrate 1 made of ferroelectric single crystalline material is generally proton-exchanged by attaching a mask with an opening corresponding to a part of the substrate to be proton-exchanged to the substrate 1 and dipping the substrate 1 into a solution as a proton-exchanging source to thereby form a proton-exchanged layer 2 in a surface portion of the substrate 1 as shown in FIG. 4(a).

The proton-exchanging source used for forming the proton-exchanged layer 2 is required to be an acid containing a lithium salt because directional dependency of diffusion coefficient of protons is needed to be controlled by controlling the above dissociation constant of the acid.

Moreover the content of the lithium salt contained in the acid is needed to be changed depending on the crystal orientation of the ferroelectric single crystalline material as the substrate, considering the directional dependency of diffusion coefficient of protons.

In the case of using an X-cut surface of a ferroelectric crystal as the substrate of ferroelectric single crystalline material, to attain the object of the present invention under good controllability, the upper limit of the content of the lithium salt in the acid is preferably 0.5 wt %, more preferably 0.2 wt %. For the above same reason, the lower limit of the content of the lithium salt in the acid is preferably 0.01 wt %, more preferably 0.1 wt %.

In the case of using a Z-cut surface of a ferroelectric crystal as the substrate of ferroelectric single crystalline material, to attain the object of the present invention under good controllability, the upper limit of the content of the lithium salt contained in the acid is preferably 3.0 wt %, more preferably 2.5 wt %. For the above same reason, the lower limit of the content of the lithium salt in the acid is preferably 1.0 wt %, more preferably 2.0 wt %.

Furthermore, the temperature of proton-exchange in forming the proton-exchanged layer 2, is preferably 200° C. and over, more preferably 230 through 260° C., considering shorting the time to form the proton-exchanged layer 2.

The time for proton-exchanging, that is, the time for proton diffusing is preferably 1 through 200 hours, more preferably 3 through 100 hours so that a coupling efficiency of optical fibers in an optical waveguide may be improved and a recessed portion 3 having satisfactory shape and scale may be assured on the substrate of ferroelectric crystalline material.

When proton-exchanging the substrate as above mentioned, in the case of using the X-cut surface of ferroelectric crystal as the main surface of the substrate of ferroelectric crystalline material to attain the object of the present invention under good controllability, the upper limit value of the square root $(D_2/D_1)^{1/2}$ of the ratio of the proton diffusion coefficient $D_2$ in a depth direction of the substrate normal to the main surface to the diffusion coefficient $D_1$ in a direction parallel to the main surface thereof, is preferably 1.4, more preferably 1.3. For the above same reason, the lower limit value of the square root is preferably 1.0, more preferably 1.1.

In the case of using the Z-cut surface of ferroelectric crystal as the main surface of the substrate of ferroelectric single crystalline material, the upper limit value of the square root $(D_2/D_1)^{1/2}$ of the ratio of the diffusion coefficient $D_2$ in a depth direction of the substrate normal to the main surface to the diffusion coefficient $D_1$ in a direction parallel to the main surface thereof, is preferably 1.1, more preferably 1.05. For the above same reason, the lower limit value of the square root is preferably 0.9, more preferably 0.95.

It is preferable that the proton-exchanged layer 2 formed as above mentioned has a half opening width with 2 μm through 4 μm and a depth with 2 μm through 4 μm.

No particular limitation is posed upon a material to be used as the ferroelectric crystalline substrate 1 in the present invention so long as the material is a ferroelectric single crystal. Such a material may include lithium niobate (LiNbO$_3$), lithium tantalate (LiTaO$_3$), potassium lithium niobate (KLN), lithium niobate-lithium tantalate solid solution (LiNbO$_{1-x}$Ta$_x$O$_3$ ($0 \leq X \leq 1$)) or the like. Among them, considering controllability of refractive index, lithium niobate-lithium tantalate solid solution is most preferable.

Moreover at least one metal element selected from the group consisting of magnesium (Mg), zinc (Zn), titanium (Ti), vanadium (V), iron (Fe), scandium (Sc), and indium (In) may be contained in the above material to improve the optical damage resistance of the substrate 1.

Furthermore, at least one selected from the group consisting of neodymium (Nd), erbium (Er), thulium (Tm), holmium (Ho), dysprosium (Dy), praseodymium (Pr) and the like of the lanthanide series as an element for laser oscillation may be contained in the above material of the substrate 1.

As the proton-exchanging source to be used for proton-exchanging, pyrophosphoric acid, benzoic acid, octanoic acid, stearic acid, palmitic acid and the like containing a lithium salt may be used. Among them, pyrophosphoric acid containing a lithium salt may be preferably used, because it has a large dissociation constant controllability.

As the lithium salt to be used in the present invention, lithium pyrophosphate, lithium benzoate, lithium octanoate, lithium stearate, lithium palmitate and the like, which are lithium salts of the above acids used as main source in the proton-exchanging source, may be used.

Figure 4B:
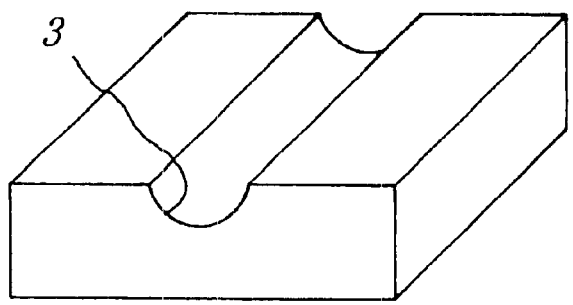

Subsequently as shown in FIG. 4(b), the proton-exchanged layer 2 formed by proton-exchanging is preferably dipped in a solution of hydrofluoric acid, nitric acid or the like, and selectively removed by wet-etching it off to form a recessed portion 3 in the substrate, in which recessed portion has its depth equal to or larger than its half opening width as shown in FIG. 2(a) or 2(b).

The proton-exchanged layer 2 is preferably removed selectively by dipping it into the above etching solution at room temperature through 100° C. for 0.5 through 1 hour.

Figure 4C:
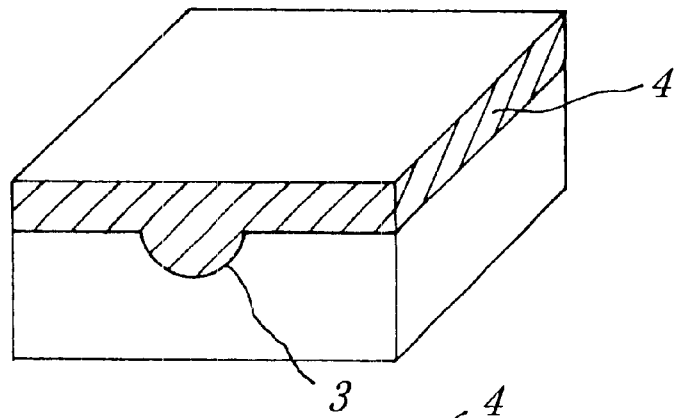

For manufacturing an embedded-type optical waveguide, as shown in FIG. 4(c), a film 4 of a ferroelectric single crystal which acts as an optical waveguide is formed on the substrate of ferroelectric single crystalline material 1 by using a liquid phase epitaxial method.

Figure 4D:
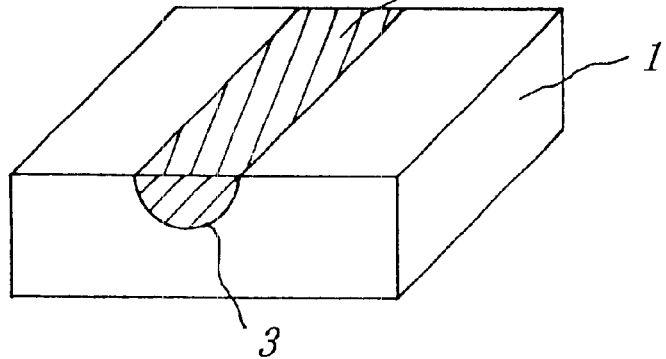

Next, as shown in FIG. 4(d), the most part of the ferroelectric single crystal film except the recessed portion is removed by chemical/mechanical polishing (CMP), and the embedded-type optical waveguide can thereafter be obtained by optically polishing the ends of the substrate.

The material of the ferroelectric crystal usable for forming the optical waveguide must have a higher refractive index than that of the ferroelectric crystal usable for the substrate so that the light wave introduced from the outer side may effectively travel in the optical waveguide formed in the recessed portion 3 of the substrate.

Concretely, lithium niobate, lithium tantalate, potassium lithium niobate, lithium niobate-lithium tantalate solid solution or the like can be used as the material of the optical waveguide. Among them, lithium niobate-lithium tantalate solid solution can be preferably used because the refractive index can be controlled by changing the ratio of niobium to tantalum.

Additionally at least one selected from the elements of the lanthanide series can be contained in the material of the optical waveguide as an additional element for laser oscillation as in the case of the substrate.

The lithium niobate-lithium tantalate solid solution is formed by contacting the substrate 1 to a melt, kept in a temperature range of 800 to 1,100° C., of lithium oxide (Li$_2$O), diniobium pentaoxide (Nb$_2$O$_5$), ditantalum pentaoxide (Ta$_2$O$_5$) and divanadium pentaoxide (V$_2$O$_5$) or boron oxide (B$_2$O$_3$) for 1~30 minutes.

Figure 5A:
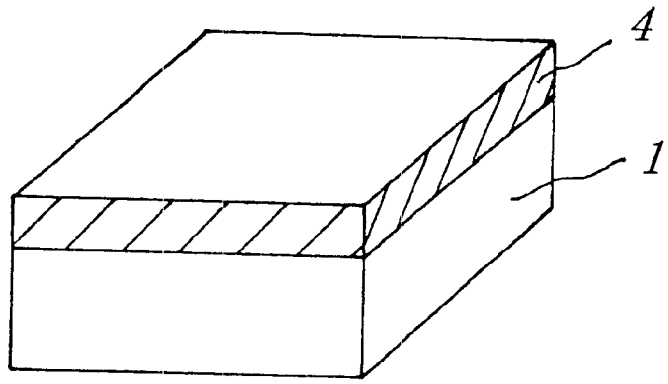
FIGS. 5(a) through 5(c) are cross sectional views showing the steps of manufacturing a ridge-type optical waveguide device.
Figure 5B:
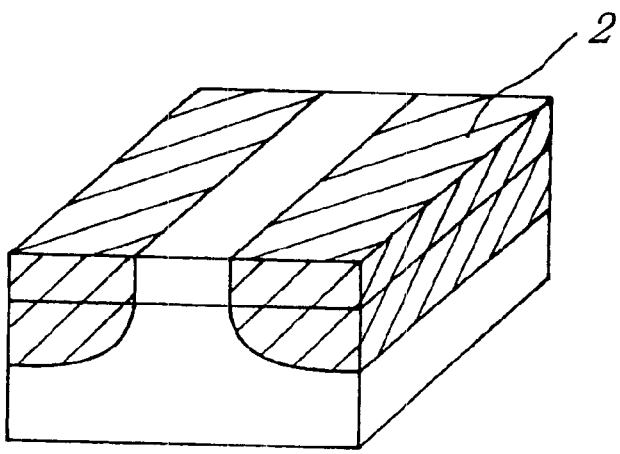
Figure 5C:
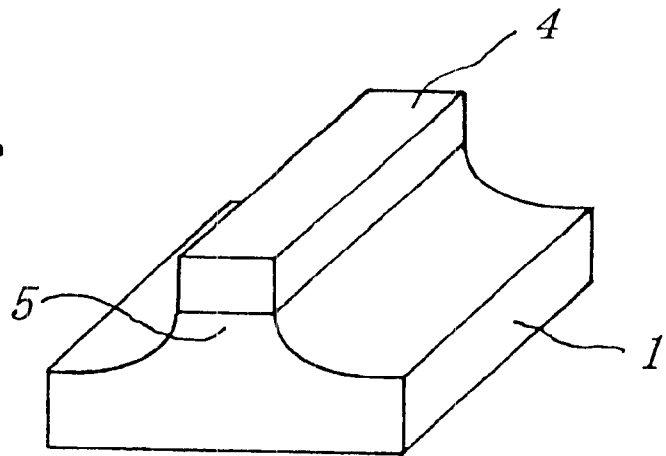

In the above, as shown in FIGS. 4(a) to 4(d), explanation is made of forming the recessed portion 3 in the substrate of ferroelectric single crystalline material 1 and forming the ferroelectric single crystal film in the recessed portion 3 to thereby obtain the embedded-type optical waveguide. However, as shown in FIGS. 5(a) to 5(c), this invention may be used for forming, on the substrate 1, a convex ridge structure 5 having shoulder portions as shown in FIGS. 3(a) and 3(b) and forming an optical waveguide onto the ridge structure portion 5 to thereby obtain a ridge-type optical waveguide.

In that case, the ferroelectric single crystal film 4 having a larger refractive index than that of the substrate 1 is formed on the substrate 1 by a liquid phase epitaxial method.

A part of the film-formed substrate except the ridge structure portion 5 to be used as an optical waveguide is proton-exchanged to form the proton-exchanged layer 2.

Next, by removing the proton-exchanged layer 2 selectively, the ridge structure portion 5 having the ferroelectric single crystal film 4 on the top thereof is formed.

EXAMPLES

The invention will be explained in more detail with reference to the following examples.

Example 1

A lithium niobate single crystal was used as a substrate. An aluminum film was formed in a thickness of about 150 nm on a Z-cut surface as a main surface of the substrate by vapor deposition. Subsequently, a mask pattern having an opening in a width of about 0.5 μm was formed from the aluminum film by photolithography and etching.

An acidic solution of benzoic acid containing 2.0 wt % of lithium benzoate was used as a proton-exchanging source. The substrate of the lithium niobate single crystal with the mask pattern was dipped in the solution kept at 230° C. for 48 hours for proton-exchanging Thereafter, the substrate with the mask pattern was dipped in a solution of hydrofluoric acid kept at 45° C. for 1 hour to selectively remove the mask pattern and the proton-exchanged layer of the substrate and form a recessed portion at the substrate.

The ditch-like shape of the recessed portion had a half opening width (a half value of the width of the opening of the recessed portion) of 3.0 μm and a depth of 3.0 μm, and thus it had a perfect semicircular shape. The square root $(D_2/D_1)^{1/2}$ of the ratio of the proton diffusion coefficient $D_2$ in a depth direction normal to the main surface of the substrate to the proton diffusion coefficient $D_1$ in a direction parallel to the main surface thereof was 1.0.

Example 2

A lithium niobate single crystal was used as a substrate.

An aluminum film was formed in a thickness of about 150 nm on an X-cut surface as a main surface of the substrate by vapor deposition.

Subsequently, a mask pattern having an opening in width of about 0.5 μm was formed from the aluminum film by photolithography and etching.

An acidic solution of benzoic acid containing 0.25 wt % of lithium benzoic acid was used as a proton-exchanging source. The substrate of the lithium niobate single crystal with the mask pattern was dipped in the solution kept at 230° C. for 12 hours to form a proton-exchanged layer.

Thereafter, the proton-exchanged layer of the substrate and the mask pattern were selectively removed to form a recessed portion thereon as in the Example 1.

The ditch-like shape of the recessed portion had a half opening width (a half value of the opening width) of 2.0 μm and a depth of 3.0 μm, and thus it had a perfect semi-elliptical shape which is deeper in the vertical direction to the main surface of the substrate. The square root $(D_2/D_1)^{1/2}$ of the ratio of the proton diffusion coefficient $D_2$ in a depth direction normal to the main surface of the substrate to the diffusion coefficient $D_1$ in a direction parallel to the main surface thereof was 1.3.

Comparative Example 1

Except that a solution of benzoic acid at 100% concentration was used and the time of dipping the substrate into the solution was 4 hours, this comparative example was carried out as in the Example 1.

The resulting ditch-like shape of a recessed portion had a half opening width (a half value of opening width) of 3.4 μm and a depth of 2.5 μm, and thus it has a semi-elliptical shape which is shallow in the depth direction of the substrate. The square root $(D_2/D_1)^{1/2}$ of the ratio of the diffusion coefficient $D_2$ in a depth direction normal to the main surface of the substrate to the diffusion coefficient $D_1$ in a direction parallel to the main surface thereof was 0.74.

Comparative Example 2

Except that a solution of benzoic acid at 100% concentration was used and the time of dipping the substrate into the solution was 3 hours, this comparative example was carried out as in the Example 2.

In this case, the proton diffusion coefficient to the substrate became extremely large and could not be controlled, so that a concave ditch structure could not be obtained.

Comparative Example 3

Except that a Y-cut surface of lithium niobate single crystal was used as a substrate, this comparative example was carried out as in the Example 1.

In this case, the proton diffusion coefficient to the substrate became extremely large and could not be controlled, so that a concave ditch structure can not be obtained as in the Comparative Example 2.

Comparative Example 4

Except that a Y-cut surface of lithium niobate single crystal was used as a substrate, this comparative example was carried out as in the Example 1.

In this case, the proton diffusion coefficient to the substrate became extremely large and could not be controlled, so that a concave ditch structure could not be obtained as in the Comparative Example 2.

As apparent from the above example, the recessed portion of the substrate formed according to the processing method of this invention has substantially semicircular shape or semi-elliptical shape which is deeper in the vertical direction to the substrate.

On the contrary, in the case of using an acid solution containing no lithium salt as a proton-exchanging source as shown in the Comparative examples 1 and 2, or using a Y-cut surface of ferroelectric single crystalline material as a substrate as shown in the Comparative Examples 3 and 4, a desired concave ditch structure can not be obtained.

As above explained, by using the processing method of the present invention, the concave ditch structure having the recessed portion with its depth equal to or larger than its half opening width can be formed. Moreover the convex ridge structure having the shoulder portions with their height equal to or larger than its radius of curvature of curved portion.

Accordingly in the case forming an optical waveguide having a large optically confining effect and a stepped refractive index, high optical fiber coupling efficiency and optical damage-resistance can be attained and optoelectrical constant can not be prevented from decreasing.

What is claimed is:

1. A method of processing a substrate made of a ferroelectric single crystalline material, comprising the steps of forming a desired proton-exchanged layer in the substrate by proton-exchanging portions of the substrate, and selectively removing the proton-exchanged layer to form a concave ditch structure in the substrate, wherein the desired proton-exchange layer is formed by using an acid containing a lithium salt as a proton-exchanging source, the surface of the substrate from which the concave ditch structure is formed is an X-cut surface or a Z-cut surface, as a main surface, of the ferroelectric single crystalline material used as the substrate, and the concave ditch structure has a recessed portion with its depth equal to or larger than its half opening width.

2. The processing method as claimed in claim 1, wherein the content of the lithium salt contained in the acid is 0.01 wt % through 0.5 wt % when the surface of the substrate from which the concave ditch structure is formed is the X-cut surface of the ferroelectric single crystalline material used as the substrate.

3. The processing method as claimed in claim 1, wherein $1.0 \leq (D_2/D_1)^{1/2} \leq 1.4$ in which $D_1$ is a proton diffusion coefficient of the substrate in a direction parallel to the main surface of the ferroelectric crystalline substrate and $D_2$ is a proton diffusion coefficient of the substrate in a depth direction normal to the main surface of the ferroelectric single crystalline substrate, when the surface of the substrate from which the concave ditch structure is formed is an X-cut surface of the ferroelectric single crystalline material used as the substrate.

4. The processing method as claimed in claim 1, wherein $0.9 \leq (D_2/D_1)^{1/2} 1.1$ in which $D_1$ is a proton diffusion coefficient of the substrate in a direction parallel to the main surface of the ferroelectric single crystalline substrate and $D_2$ is a proton diffusion coefficient of the substrate in a depth direction normal to the main surface of the ferroelectric single crystalline substrate, when the surface of the substrate from which the concave ditch structure is formed is the Z-cut surface of the ferroelectric single crystalline material used as the substrate.

5. The processing method as claimed in claim 1, wherein the lithium salt is lithium benzoate.

6. The processing method as claimed in claim 1, wherein the substrate is a single crystal having a composition of $LiNb_{1-x}Ta_xO_3$ ($0 \leq X \leq 1$).

7. The processing method as claimed in claim 1, wherein the content of the lithium salt contained in the acid is 1.0 wt % through 3.0 wt % when the surface of the substrate from which the concave ditch structure is formed is the Z-cut surface of the ferroelectric single crystalline material used as the substrate.

8. A method of processing a substrate made of a ferroelectric single crystalline material, comprising the steps of forming a desired proton-exchanged layer in the substrate by proton-exchanging portions of the substrate, and selectively removing the proton-exchanged layer to form a convex ridge structure, wherein the desired proton-exchange layer is formed by using an acid containing a lithium salt as a proton-exchanging source, the surface of the substrate from which the convex ridge structure is formed is an X-cut surface or a Z-cut surface, as a main surface, of the ferroelectric single crystalline material used as the substrate, and the convex ridge structure has shoulder portions with their height equal to or larger than a radius of curvature of each of curved portions.

9. The processing method as claimed in claim 8, wherein the content of the lithium salt contained in the acid is 1.0 wt % through 3.0 wt % when the surface of the substrate from which the convex ridge structure is formed is the Z-cut surface of the ferroelectric single crystalline material used as the substrate.

10. The processing method as claimed in claim 8, wherein the content of the lithium salt contained in the acid is 0.01 wt % through 0.5 wt % when the surface of the substrate from which the convex ridge structure is formed is the X-cut surface of the ferroelectric single crystalline material used as the substrate.

11. The processing method as claimed in claim 8, wherein $1.0 \leq (D_2/D_1)^{1/2} \leq 1.4$ in which $D_1$ is a proton diffusion coefficient of the substrate in a direction parallel to the main surface of the ferroelectric crystalline substrate and $D_2$ is a proton diffusion coefficient of the substrate in a depth direction normal to the main surface of the ferroelectric single crystalline substrate, when the surface of the substrate from which the convex ridge structure is formed is an X-cut surface of the ferroelectric single crystalline material used as the substrate.

12. The processing method as claimed in claim 8, wherein $0.9 \leq (D_2/D_1)^{1/2} \leq 1.1$ in which $D_1$ is a proton diffusion coefficient of the substrate in a direction parallel to the main surface of the ferroelectric single crystalline substrate and $D_2$ is a proton diffusion coefficient of the substrate in a depth direction normal to the main surface of the ferroelectric single crystalline substrate, when the surface of the substrate from which the convex ridge structure is formed is the Z-cut surface of the ferroelectric single crystalline material used as the substrate.

13. The processing method as claimed in claim 8, wherein the lithium salt is lithium benzoate.

14. The processing method as claimed in claim 8, wherein the substrate is a single crystal having a composition of $LiNb_{1-x}Ta_xO_3$ ($0 \leq X \leq 1$).

15. A method of manufacturing an embedded-type optical waveguide element, comprising the steps of preparing a substrate of a ferroelectric single crystalline material having a convex ridge structure formed as set forth in claim 8, and forming, in the convex ridge structure of the ferroelectric single crystalline substrate, an optical waveguide made of another ferroelectric single crystalline material having a larger refractive index than that of the substrate by a liquid phase epitaxial method.

16. A method of manufacturing an embedded-type optical waveguide element, comprising the steps of preparing a substrate of a ferroelectric single crystalline material having a concave ditch structure formed as set forth in claim 1, and forming, in the concave ditch structure of the ferroelectric single crystalline substrate, an optical waveguide made of another ferroelectric single crystalline material having a larger refractive index than that of the substrate by a liquid phase epitaxial method.

17. A substrate made of a ferroelectric single crystalline material, said substrate having a concave ditch structure, wherein a surface of the substrate from which the concave ditch structure is formed is an X-cut surface or a Z-cut surface, as a main surface, of the ferroelectric single crystalline material used as the substrate, and the concave ditch structure has a recessed portion with its depth equal to or larger than its half opening width.

18. An embedded-type optical waveguide element comprising a substrate made of a ferroelectric single crystalline material and having a concave ditch structure, and an optical waveguide formed in the concave ditch structure, wherein a surface of the substrate from which the concave ditch structure is formed is an X-cut surface or a Z-cut surface, as a main surface, of the ferroelectric single crystalline material used as the substrate, and the concave ditch structure has a recessed portion with its depth equal to or larger than its half opening width, and the optical waveguide was made of another ferroelectric single crystalline material having a larger refractive index than that of the substrate by a liquid phase epitaxial method.

19. A substrate made of a ferroelectric single crystalline material, said substrate having a convex ridge structure having curved portions at base portions of said ridge structure, wherein a surface of the substrate from which the convex ridge structure is formed is an X-cut surface or a Z-cut surface, as a main surface, of the ferroelectric single crystalline material used as the substrate, and the convex ridge structure has shoulder portions with their height equal to or larger than a radius of curvature of curved portions of said ridge structure.

* * * * *